(12) United States Patent
Nagata et al.

(10) Patent No.: US 12,116,460 B2
(45) Date of Patent: Oct. 15, 2024

(54) POLYORGANOSILSESQUIOXANE AND COMPOSITION FOR FORMING HARDCOAT LAYER

(71) Applicant: FUJIFILM Corporation, Tokyo (JP)

(72) Inventors: Yuzo Nagata, Kanagawa (JP); Tetsu Kitamura, Kanagawa (JP); Reiko Inushima, Kanagawa (JP); Akio Tamura, Kanagawa (JP); Nobuyuki Akutagawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 653 days.

(21) Appl. No.: 17/394,099

(22) Filed: Aug. 4, 2021

(65) Prior Publication Data
US 2021/0363306 A1  Nov. 25, 2021

Related U.S. Application Data

(63) Continuation of application No. PCT/JP2020/006913, filed on Feb. 20, 2020.

(30) Foreign Application Priority Data
Feb. 27, 2019 (JP) ................. 2019-034956

(51) Int. Cl.
| | | |
|---|---|---|
| C08G 77/14 | (2006.01) | |
| C08G 77/20 | (2006.01) | |
| C08G 77/24 | (2006.01) | |
| C09D 183/08 | (2006.01) | |

(52) U.S. Cl.
CPC ............ *C08G 77/14* (2013.01); *C08G 77/20* (2013.01); *C08G 77/24* (2013.01); *C09D 183/08* (2013.01)

(58) Field of Classification Search
CPC ......... C08G 77/14; C08G 77/20; C08G 77/24
See application file for complete search history.

(56) References Cited

U.S. PATENT DOCUMENTS

| | | |
|---|---|---|
| 2004/0137241 A1 | 7/2004 | Lin et al. |
| 2006/0105181 A1 | 5/2006 | Lin et al. |
| 2008/0063880 A1 | 3/2008 | Lin et al. |
| 2016/0297933 A1 | 10/2016 | Kuwana et al. |
| 2018/0066159 A1* | 3/2018 | Karkkainen ......... C09D 183/14 |
| 2018/0142127 A1 | 5/2018 | Park et al. |
| 2018/0171193 A1 | 6/2018 | Tanaka et al. |
| 2018/0201734 A1 | 7/2018 | Song et al. |

FOREIGN PATENT DOCUMENTS

| | | |
|---|---|---|
| CN | 106459370 A | 2/2017 |
| CN | 107683299 A | 2/2018 |
| CN | 108102540 A | 6/2018 |
| JP | 2004-212983 A | 7/2004 |
| JP | 2007-002194 A | 1/2007 |
| JP | 2018-517737 A | 7/2018 |
| JP | 2018-178003 A | 11/2018 |

OTHER PUBLICATIONS

Machine translation of JP 2007-002194 (no date).*
Office Action, issued by the State Intellectual Property Office on Jun. 2, 2022, in connection with Chinese Patent Application No. 202080017175.7.
Office Action, issued by the Japanese Patent Office on Jul. 19, 2022, in connection with Japanese Patent Application No. 2021-502155.
International Search Report issued in PCT/JP2020/006913 on May 19, 2020.
Written Opinion issued in PCT/JP2020/006913 on May 19, 2020.
International Preliminary Report on Patentability completed on Aug. 25, 2021, in connection with International Patent Application No. PCT/JP2020/006913.
Office Action, issued by the State Intellectual Property Office on Oct. 19, 2022, in connection with Chinese Patent Application No. 202080017175.7.
Office Action, issued by the Japanese Patent Office on Jan. 4, 2023, in connection with Japanese Patent Application No. 2021-502155.

* cited by examiner

*Primary Examiner* — Marc S Zimmer
(74) *Attorney, Agent, or Firm* — Edwards Neils LLC; Jean C. Edwards, Esq.

(57) ABSTRACT

A polyorganosilsesquioxane includes: a constitutional unit (a) having a fluorine atom-containing group; a constitutional unit (b) having a cationically polymerizable group; and a constitutional unit (c) having a radically polymerizable group.

19 Claims, No Drawings

POLYORGANOSILSESQUIOXANE AND COMPOSITION FOR FORMING HARDCOAT LAYER

CROSS-REFERENCE TO RELATED APPLICATIONS

This is a continuation of International Application No. PCT/JP2020/006913 filed on Feb. 20, 2020, which was published under Article 21(2) in Japanese, and which claims priority under 35 U.S.C. § 119 (a) from Japanese Patent Application No. 2019-034956, filed on Feb. 27, 2019. The above applications are hereby expressly incorporated by reference, in their entirety, into the present application.

BACKGROUND OF THE INVENTION

1. Field of the Invention

The present invention relates to a polyorganosilsesquioxane and a composition for forming a hardcoat layer.

2. Description of the Related Art

For image display devices such as a display device using a cathode ray tube (CRT), a plasma display panel (PDP), an electroluminescence display (ELD), a vacuum fluorescent display (VFD), a field emission display (FED), and a liquid crystal display (LCD), in order to prevent the display surface from being scratched, it is preferable to provide an optical film (hardcoat film) having a hardcoat layer on a substrate.

JP2018-178003A describes a method of obtaining a hardcoat film having excellent scratch resistance by using a fluorine-containing epoxy-modified silsesquioxane.

Polyorganosilsesquioxane is used in various fields other than the above (for example, see JP2004-212983A and JP2018-517737A).

SUMMARY OF THE INVENTION

As a result of examination, the inventors of the present invention have found that the scratch resistance of the hardcoat film described in JP2018-178003A is insufficient.

An object of the present invention is to provide a polyorganosilsesquioxane capable of forming a hardcoat film having excellent scratch resistance, and a composition for forming a hardcoat layer.

As a result of intensive examination, the inventors of the present invention have found that the above object can be achieved by the following means.

<1>
A polyorganosilsesquioxane basing a constitutional unit (a) having a fluorine atom-containing group, a constitutional unit (b) having a cationically polymerizable group, and a constitutional unit (c) having a radically polymerizable group.

<2>
The polyorganosilsesquioxane described in <1>, in which the constitutional unit (a) is a constitutional unit represented by the following General Formula (S-1),
  the constitutional unit (b) is a constitutional unit represented by the following General Formula (S-2), and
  the constitutional unit (c) is a constitutional unit represented by the following General Formula (S-3).

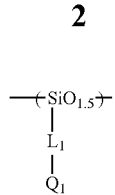

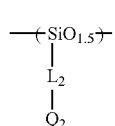

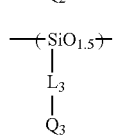

In the General Formula (S-1), $L_1$ represents a single bond or a divalent linking group, and $Q_1$ represents the fluorine atom-containing group.

In the General Formula (S-2), $L_2$ represents a single bond or a divalent linking group, and $Q_2$ represents the cationically polymerizable group.

In the General Formula (S-3), $L_3$ represents a single bond or a divalent linking group, and $Q_3$ represents the radically polymerizable group.

<3>
The polyorganosilsesquioxane described in <1> or <2>, in which the cationically polymerizable group of the constitutional unit (b) is an epoxy group.

<4>
The polyorganosilsesquioxane described in <3> in which the epoxy group is an alicyclic epoxy group.

<5>
The polyorganosilsesquioxane described in any one of <1> to <4>, in which the radically polymerizable group of the constitutional unit (c) is a (meth)acryloyl group.

<6>
The polyorganosilsesquioxane described in any one of <1> to <5>, in which the number of fluorine atoms contained in the fluorine atom-containing group of the constitutional unit (a) is 9 or more.

<7>
The polyorganosilsesquioxane described in any one of <1> to <6>, in which a molar ratio of a content of the constitutional unit (a) to a total content of constitutional units of the polyorganosilsesquioxane is 50 mol % or less.

<8>
The polyorganosilsesquioxane described in any one of <1> to <7>, in which a molar ratio of a content of the constitutional unit (b) to a total content of constitutional units of the polyorganosilsesquioxane is 15 mol % or more.

<9>
The polyorganosilsesquioxane described in any one of <1> to <8>, in which a molar ratio of a content of the constitutional unit (c) to a total content of constitutional units of the polyorganosilsesquioxane is 15 mol % or more.

<10>
A composition for forming a hardcoat layer containing the polyorganosilsesquioxane described in any one of <1> to <9>.

According to the present invention, it is possible to provide a polyorganosilsesquioxane capable of forming a hardcoat film having excellent scratch resistance, and a composition for forming a hardcoat layer.

DESCRIPTION OF THE PREFERRED EMBODIMENTS

Hereinafter, embodiments of the present invention will be specifically described, but the present invention is not limited thereto. In the present specification, in a case where numerical values represent a value of physical properties, a value of characteristics, and the like, the description of "(numerical value 1) to (numerical value 2)" means "(numerical value 1) or more and (numerical value 2) or less". In addition, in the present specification, the description of "(meth)acrylate" means "at least one of acrylate or methacrylate". The same shall be applied to "(meth)acrylic acid", "(meth)acryloyl", and the like.

[Polyorganosilsesquioxane]

The polyorganosilsesquioxane according to an embodiment of the present invention has a constitutional unit (a) having a fluorine atom-containing group, a constitutional unit (b) having a cationically polymerizable group, and a constitutional unit (c) having a radically polymerizable group.

The structure of the polyorganosilsesquioxane is not particularly limited, and any of the structures that the polyorganosilsesquioxane can have may be adopted. For example, the polyorganosilsesquioxane preferably has a random structure, a ladder structure, a cage structure, and the like.

[Constitutional Unit (a) Having Fluorine Atom-Containing Group]

The constitutional unit (a) having a fluorine atom-containing group (also called "constitutional unit (a)") contained in the polyorganosilsesquioxane according to the embodiment of the present invention will be described.

The fluorine atom-containing group (also called "fluorine-containing group") is a group containing at least one fluorine atom. Examples thereof include a fluorine atom, an organic group having at least one fluorine atom, and the like. Examples of the organic group include an alkyl group, a cycloalkyl group, an alkenyl group, a cycloalkenyl group, an alkynyl group, a cycloalkynyl group, an aryl group, and a group formed by combining at least two of these. The organic group is preferably an alkyl group. The alkyl group, cycloalkyl group, alkenyl group, cycloalkenyl group, alkynyl group, cycloalkynyl group, and aryl group described above may have a substituent in addition to a fluorine atom.

The fluorine-containing group is preferably a fluoroalkyl group having 1 to 20 carbon atoms, more preferably a fluoroalkyl group having 2 to 15 carbon atoms, even more preferably a fluoroalkyl group having 4 to 10 carbon atoms, and particularly preferably a fluoroalkyl group having 4 to 8 carbon atoms.

The number of fluorine atoms contained in one fluorine-containing group is preferably 3 or more, more preferably 5 or more, and even more preferably 9 or more.

The number of fluorine atoms contained in one fluorine-containing group is preferably 17 or less, find more preferably 13 or less.

The fluorine-containing group is preferably a group represented by General Formula (f-1).

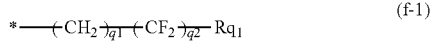

(f-1)

In General Formula (f-1), q1 represents an integer of 0 to 12, q2 represents an integer of 1 to 8, and $Rq_1$ represents a hydrogen atom or a fluorine atom. * Represents a binding position.

q1 preferably represents an integer of 1 to 7, more preferably represents an integer of 1 to 5, and even more preferably represents 1 or 2.

q2 preferably represents an integer of 2 to 8, more preferably represents an integer of 4 to 8, and even more preferably represents an integer of 4 to 6.

$Rq_1$ preferably represents a fluorine atom.

The constitutional unit (a) is preferably a constitutional unit represented by General Formula (S-1).

(S-1)

In General Formula (S-1), $L_1$ represents a single bond or a divalent linking group, and $Q_1$ represents a fluorine atom-containing group.

In General Formula (S-1), "$SiO_{1.5}$" represents a silsesquioxane unit.

In General Formula (S-1), $L_1$ represents a single bond or a divalent linking group. In a case where $L_1$ represents a divalent linking group, examples thereof include —O—, —CO—, —COO—, —OCO—, —S—, —SO$_2$—, —NR—, or an organic linking group having 1 to 20 carbon atoms (for example, an alkylene group which may have a substituent, a cycloalkylene group which may have a substituent, an arylene group which may have a substituent, or the like), a linking group formed by combining two or more of these, and the like. R represents a hydrogen atom or a substituent.

In General Formula (S-1), $Q_1$ represents a fluorine atom-containing group. The fluorine atom-containing group is as described above.

The constitutional unit represented by General Formula (S-1) is preferably a constitutional unit represented by General Formula (S-1-f).

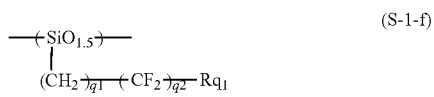

(S-1-f)

In General Formula (S-1-f), q1 represents an integer of 0 to 12, q2 represents an integer of 1 to 8, and $Rq_1$ represents a hydrogen atom or a fluorine atom.

q1, q2, and $Rq_1$ in General Formula (S-1-f) are the same as q1, q2, and $Rq_1$ in General Formula (f-1) described above, respectively.

In General Formula (S-1-f), "$SiO_{1.5}$" represents a silsesquioxane unit.

From the viewpoint of scratch resistance, in the polyorganosilsesquioxane according to the embodiment of the present invention, the molar ratio of the content of the constitutional unit (a) to the total content of constitutional units is preferably 70 mol % or less, more preferably 50 mol % or less, even more preferably 30 mol % or less, and particularly preferably 20 mol % or less.

Furthermore, in the polyorganosilsesquioxane according to the embodiment of the present invention, the molar ratio of the content of the constitutional unit (a) to the total content of constitutional units is preferably 1 mol % or more, more preferably 3 mol % or more, and even more preferably 5 mol % or more.

[Constitutional Unit (b) Having Cationically Polymerizable Group]

The constitutional unit (b) having a cationically polymerizable group (also called "constitutional unit (b)") contained in the polyorganosilsesquioxane according to the embodiment of the present invention will be described.

As the cationically polymerizable group, a generally known cationically polymerizable group can be used without particular limitations. Specifically, examples thereof include an alicyclic ether group, a cyclic acetal group, a cyclic lactone group, a cyclic thioether group, a spiro-orthoester group, a vinyloxy group, and the like. As the cationically polymerizable group, an alicyclic ether group and a vinyloxy group are preferable, an epoxy group, an oxetanyl group, and a vinyloxy group are particularly preferable, and an epoxy group is most preferable. As the epoxy group, an alicyclic epoxy group (a group having a condensed ring structure of an epoxy group and an alicyclic group) is particularly preferable. Each of the above groups may have a substituent.

The cationically polymerizable group is preferably a group represented by Formula (e-1), a group represented by General Formula (e-2), or a group represented by General Formula (e-3).

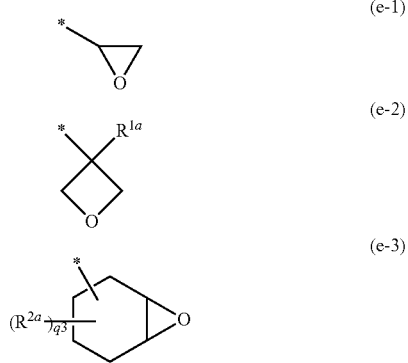

In General Formula (e-2), $R^{1a}$ represents a hydrogen atom or a substituted or unsubstituted alkyl group.

In General Formula (e-3), $R^{2a}$ represents a substituted or unsubstituted alkyl group. q3 represents an integer of 0 to 2. In a case where there is a plurality of $R^{2a}$'s, they may be the same or different from each other.

In Formula (e-1), General Formula (e-2), and General Formula (e-3), * represents a binding position.

In General Formula (e-2), $R^{1a}$ represents a hydrogen atom or a substituted or unsubstituted alkyl group.

$R^{1a}$ preferably represents a substituted or unsubstituted alkyl group having 1 to 6 carbon atoms. Examples of the alkyl group having 1 to 6 carbon atoms include a methyl group, an ethyl group, a n-propyl group, an i-propyl group, a n-butyl group, a n-hexyl group, and the like.

In a case where the alkyl group has a substituent, examples of the substituent include a hydroxyl group, a carboxyl group, an alkoxy group, an aryl group, a heteroaryl group, a halogen atom, a nitro group, a cyano group, a silyl group, and the like.

$R^{1a}$ is preferably an unsubstituted linear alkyl group having 1 to 3 carbon atoms, and more preferably a methyl group or an ethyl group.

In General Formula (e-3), $R^{2a}$ represents a substituted or unsubstituted alkyl group.

$R^{2a}$ preferably represents a substituted or unsubstituted alkyl group having 1 to 6 carbon atoms. Examples of the alkyl group having 1 to 6 carbon atoms include a methyl group, an ethyl group, a n-propyl group, an i-propyl group, a n-butyl group, a n-hexyl group, and the like.

In a case where the alkyl group has a substituent, examples of the substituent include a hydroxyl group, a carboxyl group, an alkoxy group, an aryl group, a heteroaryl group, a halogen atom, a nitro group, a cyano group, a silyl group, and the like.

$R^{2a}$ is preferably an unsubstituted linear alkyl group having 1 to 3 carbon atoms, and more preferably a methyl group or an ethyl group.

q3 represents an integer of 0 to 2. q3 is preferably 0 or 1, and more preferably 0.

The constitutional unit (b) is preferably a constitutional unit represented by General Formula (S-2).

In General Formula (S-2), $L_2$ represents a single bond or a divalent linking group, and $Q_2$ represents a cationically polymerizable group.

In General Formula (S-2), "$SiO_{1.5}$" represents a silsesquioxane unit.

In General Formula (S-2), $L_2$ represents a single bond or a divalent linking group. In a case where $L_2$ represents a divalent linking group, specific examples thereof are the same as those of the divalent linking group represented by $L_1$. The divalent linking group is preferably an alkylene group having 1 to 10 carbon atoms which may have a substituent, —O—, —CO—, —COO—, —OCO—, —S—, or a linking group formed by combining two or more of these, more preferably an alkylene group having 1 to 5 carbon atoms which may have a substituent, —O—, —CO—, —COO—, —OCO—, or a linking group formed by combining two or more of these, and even more preferably an alkylene group having 1 to 5 carbon atoms which may have a substituent or a linking group formed by combining —O— with an alkylene group having 1 to 5 carbon atoms which may have a substituent.

In General Formula (S-2), $Q_2$ represents a cationically polymerizable group. The cationically polymerizable group is as described above.

The constitutional unit represented by General Formula (S-2) is preferably a constitutional unit represented by General Formula (S-2-e1), a constitutional unit represented by General Formula (S-2-e2), or a constitutional unit represented by General Formula (S-2-e3).

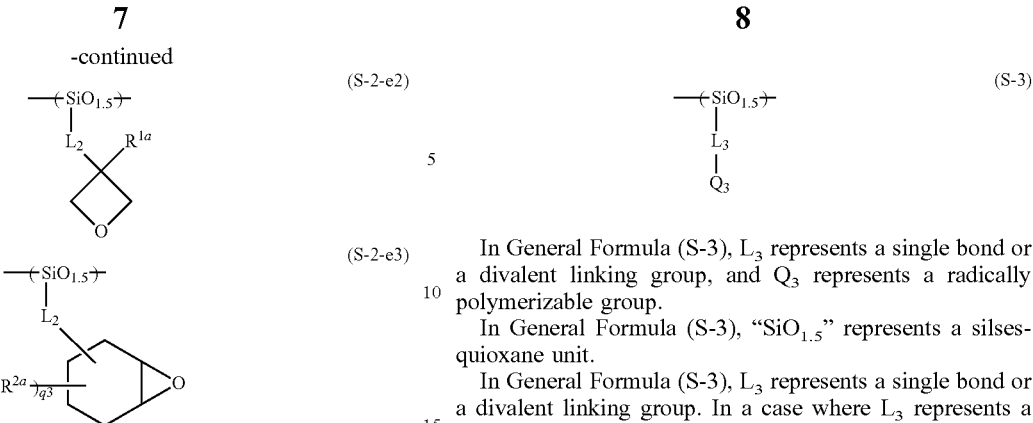

In General Formula (S-2-e1), $L_2$ represents a single bond or a divalent linking group.

In General Formula (S-2-e2), $R^{1a}$ represents a hydrogen atom or a substituted or unsubstituted alkyl group, and $L_2$ represents a single bond or a divalent linking group.

In General Formula (S-2-e3), $R^{2a}$ represents a substituted or unsubstituted alkyl group. q3 represents an integer of 0 to 2. In a case where there is a plurality of $R^{2a}$'s, they may be the same or different from each other. $L_2$ represents a single bond or a divalent linking group.

In General Formulas (S-2-e1), (S-2-e2), and (S-2-e3), "$SiO_{1.5}$" represents a silsesquioxane unit.

$L_2$ in General Formulas (S-2-e1), (S-2-e2), and (S-2-e3) is the same as $L_2$ in General Formula (S-2) described above.

$R^{1a}$ in General Formula (S-2-e2) is the same as $R^{1a}$ in General Formula (e-2) described above.

$R^{2a}$ and q3 in General Formula (S-2-e3) are the same as $R^{2a}$ and q3 in General Formula (e-3) described above, respectively.

From the viewpoint of scratch resistance, in the polyorganosilsesquioxane according to the embodiment of the present invention, the molar ratio of the content of the constitutional unit (b) to the total content of constitutional units is preferably 15 mol % or more, more preferably 20 mol % or more, and even more preferably 30 mol % or more.

Furthermore, in the polyorganosilsesquioxane according to the embodiment of the present invention, the molar ratio of the content of the constitutional unit (b) to the total content of constitutional units is preferably 85 mol % or less, more preferably 70 mol % or less, and even more preferably 60 mol % or less.

[Constitutional Unit (c) Having Radically Polymerizable Group]

The constitutional unit (c) having a radically polymerizable group (also called "constitutional unit (c)") contained in the polyorganosilsesquioxane according to the embodiment of the present invention will be described.

As the radically polymerizable group, generally known radically polymerizable groups can be used without particular limitations. Examples of the radically polymerizable group include polymerizable unsaturated groups. Specifically, examples thereof include a (meth)acryloyl group, a vinyl group, an allyl group, and the like. Among these, a (meth)acryloyl group is preferable. Each of the above groups may have a substituent.

The constitutional unit (c) is preferably a constitutional unit represented by General Formula (S-3).

$$\begin{array}{c} -\!\!\!-\!\!(SiO_{1.5})\!\!-\!\!\!- \\ | \\ L_3 \\ | \\ Q_3 \end{array} \quad (S\text{-}3)$$

In General Formula (S-3), $L_3$ represents a single bond or a divalent linking group, and $Q_3$ represents a radically polymerizable group.

In General Formula (S-3), "$SiO_{1.5}$" represents a silsesquioxane unit.

In General Formula (S-3), $L_3$ represents a single bond or a divalent linking group. In a case where $L_3$ represents a divalent linking group, specific examples and preferable ranges thereof are the same as those of $L_2$ described above.

In General Formula (S-3), $Q_3$ represents a radically polymerizable group. The radically polymerizable group is as described above.

The constitutional unit represented by General Formula (S-3) is preferably a constitutional unit represented by General Formula (S-3-r1) or a constitutional unit represented by General Formula (S-3-r2).

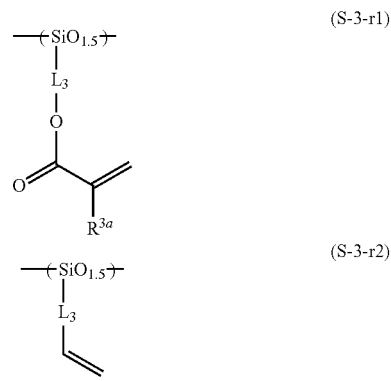

In General Formula (S-3-r1), $L_3$ represents a single bond or a divalent linking group, and $R^{3a}$ represents a hydrogen atom or a methyl group.

In General Formula (S-3-r2), $L_3$ represents a single bond or a divalent linking group.

In General Formulas (S-3-r1) and (S-3-r2), "$SiO_{1.5}$" represents a silsesquioxane unit.

$L_3$ in General Formulas (S-3-r1) and (S-3-r2) is the same as $L_3$ in General Formula (S-3) described above.

From the viewpoint of scratch resistance, in the polyorganosilsesquioxane according to the embodiment of the present invention, the molar ratio of the content of the constitutional unit (c) to the total content of constitutional units is preferably 15 mol % or more, more preferably 20 mol % or more, and even more preferably 30 mol % or more.

Furthermore, in the polyorganosilsesquioxane according to the embodiment of the present invention, the molar ratio of the content of the constitutional unit (c) to the total content of constitutional units is preferably 85 mol % or less, more preferably 70 mol % or less, and even more preferably 60 mol % or less.

The weight-average molecular weight (Mw) of the polyorganosilsesquioxane according to the embodiment of the present invention is preferably 500 to 50,000, more preferably 1,000 to 30,000, and even more preferably 1500 to 12,000.

The molecular weight dispersity (Mw/Mn) of the polyorganosilsesquioxane according to the embodiment of the present invention is for example, 1.00 to 4.00, preferably 1.10 to 3.70, more preferably 1.20 to 3.00, and even more preferably 1.20 to 2.50. Mw represents weight-average molecular weight and Mn represents number-average molecular weight.

Unless otherwise specified, the weight-average molecular weight and the molecular weight dispersity of the polyorganosilsesquioxane according to the embodiment of the present invention are values (expressed in terms of polystyrene) measured by GPC. Specifically, HLC-8220 (manufactured by TOSOH CORPORATION) is prepared as a device, and the weight-average molecular weight is measured using a differential refractive index (RI) detector under the conditions of a temperature was 23° C. and a flow rate of 1 mL/min by using tetrahydrofuran as an eluent and TSKgel (registered trademark) G3000HXL+TSKgel (registered trademark) G2000HXL as columns.

As described above, in the polyorganosilsesquioxane according to the embodiment of the present invention, the constitutional unit (a) is preferably a constitutional unit represented by General Formula (S-1), the constitutional unit (b) is preferably a constitutional unit represented by General Formula (S-2), and the constitutional unit (c) is preferably a constitutional unit represented by General Formula (S-3).

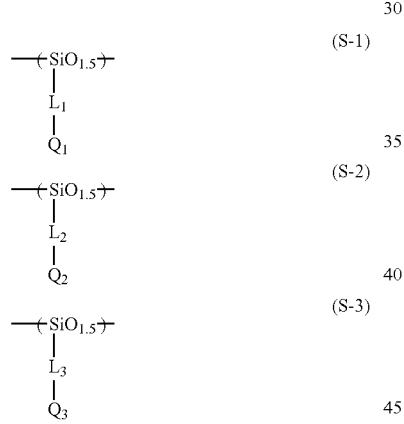

In General Formula (S-1), $L_1$ represents a single bond or a divalent linking group, and $Q_1$ represents a fluorine atom-containing group.

In General Formula (S-2), $L_2$ represents a single bond or a divalent linking group, and $Q_2$ represents a cationically polymerizable group.

In General Formula (S-3), $L_3$ represents a single bond or a divalent linking group, and $Q_3$ represents a radically polymerizable group.

$L_1$, $Q_1$, $L_2$, $Q_2$, $L_3$, and $Q_3$ are as described above. Particularly, the polyorganosilsesquioxane according to the embodiment of the present invention preferably has an epoxy group (preferably an alicyclic epoxy group) as a cationically polymerizable group and a (meth)acryloyl group as a radically polymerizable group.

Specific examples of the polyorganosilsesquioxane according to the embodiment of the present invention will be shown below, but the present invention is not limited thereto. In the following structural formulas, "$SiO_{1.5}$" represents a silsesquioxane unit.

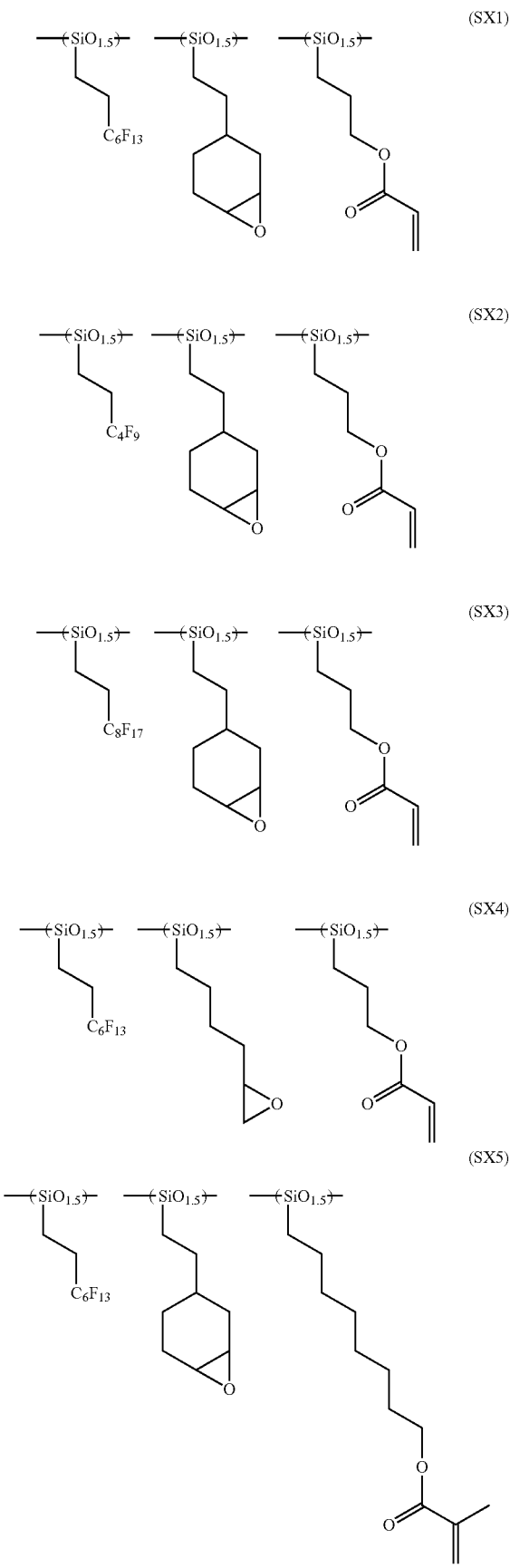

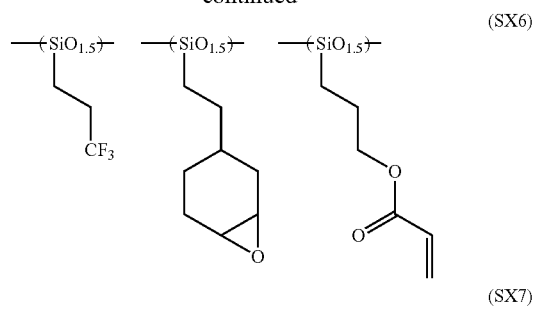

(SX6)

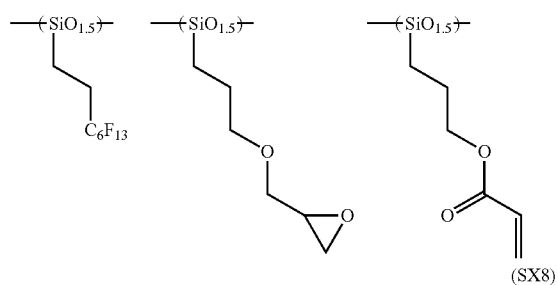

(SX7)

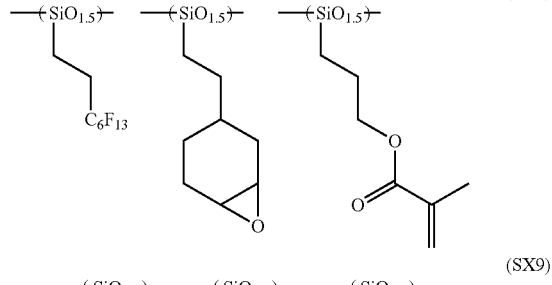

(SX8)

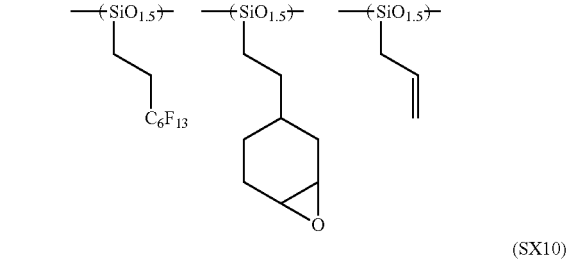

(SX9)

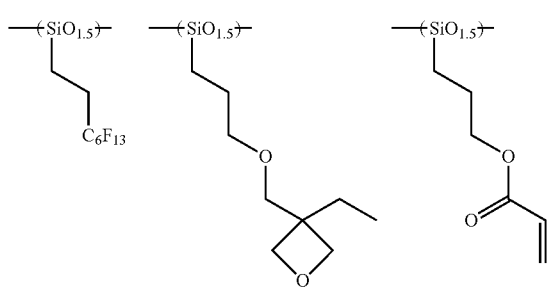

(SX10)

<Method for Manufacturing Polyorganosilsesquioxane>

The method for manufacturing the polyorganosilsesquioxane according to the embodiment of the present invention is not particularly limited. The polyorganosilsesquioxane can be manufactured using known manufacturing methods such as a method of hydrolyzing and condensing a hydrolyzable silane compound. As the hydrolyzable silane compound, it is preferable to use a hydrolyzable trifunctional silane compound having a fluorine atom-containing group (preferably a compound represented by General Formula (Sd-1)), a hydrolyzable trifunctional silane compound hav- ing a cationically polymerizable group (preferably a compound represented by General Formula (Sd-2)), and a hydrolyzable trifunctional silane compound having a radically polymerizable group (preferably a compound represented by General Formula (Sd-3)).

The compound represented by General Formula (Sd-1) corresponds to the constitutional unit represented by General Formula (S-1), the compound represented by General Formula (Sd-2) corresponds to the constitutional unit represented by General Formula (S-2), and the compound represented by General Formula (Sd-3) corresponds to the constitutional unit represented by General Formula (S-3).

$$X^6-\underset{\underset{Q_1}{\overset{\overset{X^5}{|}}{|}}{|}}{Si}-X^4 \quad (Sd\text{-}1)$$

$$X^9-\underset{\underset{Q_2}{\overset{\overset{X^8}{|}}{|}}{|}}{Si}-X^7 \quad (Sd\text{-}2)$$

$$X^{12}-\underset{\underset{Q_3}{\overset{\overset{X^{11}}{|}}{|}}{|}}{Si}-X^{10} \quad (Sd\text{-}3)$$

In General Formula (Sd-1), $X^4$ to $X^6$ each independently represent an alkoxy group or a halogen atom, $L_1$ represents a single bond or a divalent linking group, and $Q_1$ represents a fluorine atom-containing group.

In General Formula (Sd-2), $X^7$ to $X^9$ each independently represent an alkoxy group or a halogen atom, $L_2$ represents a single bond or a divalent linking group, and $Q_2$ represents a cationically polymerizable group.

In General Formula (Sd-3), $X^{10}$ to $X^{12}$ each independently represent an alkoxy group or a halogen atom, $L_3$ represents a single bond or a divalent linking group, and $Q_3$ represents a radically polymerizable group.

$L_1$ and $Q_1$ in General Formula (Sd-1) have the same definition as $L_1$ and $Q_1$ in General Formula (S-1) respectively, and the preferable ranges thereof are also the same.

$L_2$ and $Q_2$ in General Formula (Sd-2) have the same definition as $L_2$ and $Q_2$ in General Formula (S-2) respectively, and the preferable ranges thereof are also the same.

$L_3$ and $Q_3$ in General Formula (Sd-3) have the same definition as $L_3$ and $Q_3$ in General Formula (S-3) respectively, and the preferable ranges thereof are also the same.

In General Formulas (Sd-1) to (Sd-3), $X^4$ to $X^{12}$ each independently represent an alkoxy group or a halogen atom.

Examples of the alkoxy group include an alkoxy group having 1 to 4 carbon atoms, such as a methoxy group, an ethoxy group, a propoxy group, an isopropyloxy group, a butoxy group, and an isobutyloxy group, and the like.

Examples of the halogen atom include a fluorine atom, a chlorine atom, a bromine atom, an iodine atom, and the like.

As $X^4$ to $X^{12}$, an alkoxy group is preferable, and a methoxy group and an ethoxy group are more preferable. $X^4$ to $X^{12}$ may be the same or different from each other.

The amount of the above hydrolyzable silane compounds used and the composition thereof can be appropriately adjusted depending on the desired structure of the polyorganosilsesquioxane.

Furthermore, the hydrolysis and condensation reactions of the hydrolyzable silane compounds can be performed simultaneously or sequentially. In a case where the above reactions are sequentially performed, the order of performing the reactions is not particularly limited.

The hydrolysis and condensation reactions of the hydrolyzable silane compounds can be carried out in the presence or absence of a solvent, and are preferably carried out in the presence of a solvent.

Examples of the solvent include aromatic hydrocarbons such as benzene, toluene, xylene, and ethylbenzene; ethers such as diethyl ether, dimethoxyethane, tetrahydrofuran, and dioxane; ketones such as acetone, methyl ethyl ketone, and methyl isobutyl ketone; esters such as methyl acetate, ethyl acetate, isopropyl acetate, and butyl acetate; amides such as N,N-dimethylformamide and N,N-dimethylacetamide; nitrites such as acetonitrile, propionitrile, and benzonitrile; alcohols such as methanol, ethanol, isopropyl alcohol, and butanol, and the like.

As the solvent, ketones or ethers are preferable. One kind of solvent can be used singly, or two or more kinds of solvents can be used in combination.

The amount of the solvent used is not particularly limited, and can be appropriately adjusted depending on the desired reaction time or the like so that the amount falls into a range of 0 to 2,000 parts by mass with respect to the total amount (100 parts by mass) of the hydrolyzable silane compounds in general.

The hydrolysis and condensation reactions of the hydrolyzable silane compounds are preferably performed in the presence of a catalyst and water. The catalyst may be an acid catalyst or an alkali catalyst.

The acid catalyst is not particularly limited, and examples thereof include mineral acids such as hydrochloric acid, sulfuric acid, nitric acid, phosphoric acid, and boric acid; phosphoric acid esters; carboxylic acids such as acetic acid, formic acid, and trifluoroacetic acid; sulfonic acids such as methanesulfonic acid, trifluoromethanesulfonic acid, and p-toluenesulfonic acid; solid acids such as activated clay; Lewis acids such as iron chloride, and the like.

The alkali catalyst is not particularly limited, and examples thereof include alkali metal hydroxides such as lithium hydroxide, sodium hydroxide, potassium hydroxide, and cesium hydroxide; alkali earth metal hydroxides such as magnesium hydroxide, calcium hydroxide, and barium hydroxide; alkali metal carbonate such as lithium carbonate, sodium carbonate, potassium carbonate, and cesium carbonate; alkali earth metal carbonates such as magnesium carbonate; alkali metal hydrogen carbonates such as lithium hydrogen carbonate, sodium hydrogen carbonate, potassium hydrogen carbonate, and cesium hydrogen carbonate; alkali metal organic acid salts (for example, acetate) such as lithium acetate, sodium acetate, potassium acetate, and cesium acetate; alkali earth metal organic acid salts (for example, acetate) such as magnesium acetate; alkali metal alkoxides such as lithium methoxide, sodium methoxide, sodium ethoxide, sodium isopropoxide, potassium ethoxide, and potassium t-butoxide; alkali metal phenoxides such as sodium phenoxide; amines (tertiary amines and the like) such as triethylamine, N-methylpiperidine, 1,8-diazabicyclo [5.4.0]undec-7-ene, and 1,5-diazabicyclo[4.3.0]non-5-ene, nitrogen-containing aromatic heterocyclic compounds such as pyridine, 2,2'-bipyridyl, and 1,10-phenanthroline, and the like.

One kind of catalyst can be used singly, or two or more kinds of catalysts can be used in combination. Furthermore, the catalyst can be used in a state of being dissolved or dispersed in water, a solvent, or the like.

The amount of the catalyst used is not particularly limited, and can be appropriately adjusted within a range of 0.002 to 0.200 mol with respect to the total amount (1 mol) of the hydrolyzable silane compounds in general.

The amount of water used in the above hydrolysis and condensation reactions is not particularly limited, and can be appropriately adjusted within a range of 0.5 to 40 mol with respect to the total amount (1 mol) of the hydrolyzable silane compounds in general.

The method of adding water is not particularly limited. The entirety of water to be used (total amount of water to be used) may be added at once or added sequentially. In a case where water is added sequentially, the water may be added continuously or intermittently.

The reaction temperature of the hydrolysis and condensation reactions is not particularly limited. For example, the reaction temperature is 40° C. to 100° C. and preferably 45° C. to 80° C. The reaction time of the hydrolysis and condensation reactions is not particularly limited. For example, the reaction time is 0.1 to 15 hours and preferably 1.5 to 10 hours. Furthermore, the hydrolysis and condensation reactions can be carried out under normal pressure or under pressure that is increased or reduced. The hydrolysis and condensation reactions may be performed, for example, in any of a nitrogen atmosphere, an inert gas atmosphere such as argon gas atmosphere, or an aerobic atmosphere such as an air atmosphere. Among these, the inert gas atmosphere is preferable.

The polyorganosilsesquioxane according to the embodiment of the present invention can be obtained by the hydrolysis and condensation reactions of the hydrolyzable silane compounds described above. After the hydrolysis and condensation reactions end, the catalyst may be neutralized. In addition, the polyorganosilsesquioxane according to the embodiment of the present invention may be separated and purified by a separation method such as rinsing, acid cleaning, alkali cleaning, filtration, concentration, distillation, extraction, crystallization, recrystallization, or column chromatography, or by a separation method using these in combination.

The polyorganosilsesquioxane according to the embodiment of the present invention can be used for various uses. For example, the polyorganosilsesquioxane according to the embodiment of the present invention can be used in a composition for forming a hardcoat layer. As will be described later, by using the composition for forming a hardcoat layer containing the polyorganosilsesquioxane according to the embodiment of the present invention, it is possible to manufacture a hardcoat film having excellent scratch resistance.

By using the polyorganosilsesquioxane according to the embodiment of the present invention, it is possible to manufacture a hardcoat film having excellent scratch resistance. Details of the mechanism are unclear, but are assumed to be as below according to the inventors of the present invention.

In a preferred aspect, the hardcoat film, for which the polyorganosilsesquioxane according to the embodiment of the present invention can be used, has a substrate, a hardcoat laser, and an anti-scratch layer in this order. The hardcoat layer is preferably formed by curing a composition for forming a hardcoat layer containing the polyorganosilsesquioxane according to the embodiment of the present invention and a polyorganosilsesquioxane (a1) having a cationically polymerizable group that will be described later. The anti-scratch layer is preferably formed by curing a composition for forming an anti-scratch layer containing a radically polymerizable compound (c1).

Presumably, in a case where a cured product of the composition for forming an anti-scratch layer containing the radically polymerizable compound (c1) is formed on a cured product of the composition for forming a hardcoat layer containing the polyorganosilsesquioxane (a1) having a cationically polymerizable group, because the hardcoat layer is a cationic polymerization system whereas the anti-scratch layer is a radical polymerization system, these layers may have different polymerization systems, which may weaken the interlayer adhesiveness and hinder the improvement of scratch resistance.

In the present invention, the polyorganosilsesquioxane having the constitutional unit (a) having a fluorine atom-containing group, the constitutional unit (b) having a cationically polymerizable group, and the constitutional unit (c) having a radically polymerizable group is added to the composition for forming a hardcoat layer. Presumably, for this reason, the polyorganosilsesquioxane may function its an interlayer adhesive, which may enhance interlayer adhesiveness and result in excellent scratch resistance.

More specifically, because the polyorganosilsesquioxane according to the embodiment of the present invention has the constitutional unit (a) having a fluorine atom-containing group, in a case where the composition for forming a hardcoat layer is used for coating, the polyorganosilsesquioxane according to the embodiment of the present invention is localized on a surface of the hardcoat layer (surface on the air interface side), which can be efficient for interlayer adhesion.

The polyorganosilsesquioxane according to the embodiment of the present invention has the constitutional unit (b) having a cationically polymerizable group. Therefore, the polyorganosilsesquioxane can bind to the polyorganosilsesquioxane (a1) having a cationically polymerizable group, which is a material of a hardcoat layer, by a polymerization reaction.

Furthermore, the polyorganosilsesquioxane according to the embodiment of the present invention has the constitutional unit (c) having a radically polymerizable group. Therefore, the polyorganosilsesquioxane can bind to the radically polymerizable compound (c1), which is a material of an anti-scratch layer, by a polymerization reaction.

Therefore, the polyorganosilsesquioxane according to the embodiment of the present invention can bind to both the material of the hardcoat layer and the material of the anti-scratch layer. Presumably, for this reason, the polyorganosilsesquioxane could improve interlayer adhesiveness, and scratch resistance could be improved accordingly.

[Composition for Forming Hardcoat Layer]

The composition for forming a hardcoat layer according to an embodiment of the present invention contains the polyorganosilsesquioxane according to the embodiment of the present invention described above.

The content rate of the polyorganosilsesquioxane according to the embodiment of the present invention in the composition for forming a hardcoat layer according to the embodiment of the present invention is not particularly limited. From the viewpoint of scratch resistance, the content rate of the polyorganosilsesquioxane with respect to the total solid content in the composition for forming a hardcoat layer is preferably 0.001% to 5% by mass, more preferably 0.01% to 3% by mass, even more preferably 0.1% to 2% by mass, and particularly preferably 0.1% to 1% by mass.

In the composition for forming a hardcoat layer according to the embodiment of the present invention, only one kind of polyorganosilsesquioxane according to the embodiment of the present invention may be used, or two or more kinds of polyorganosilsesquioxanes according to the embodiment of the present invention having different structures may be used in combination.

Hereinafter, other components that may be contained in the composition for forming a hardcoat layer according to the embodiment of the present invention will be described.

(Polyorganosilsesquioxane (a1) Having Cationically Polymerizable Group)

The composition for forming a hardcoat layer according to the embodiment of the present invention preferably contains a polyorganosilsesquioxane (a1) having a cationically polymerizable group (also called "polyorganosilsesquioxane (a1)").

The polyorganosilsesquioxane (a1) is a component different from the aforementioned polyorganosilsesquioxane according to the embodiment of the present invention.

As the cationically polymerizable group in the polyorganosilsesquioxane (a1), a generally known cationically polymerizable group can be used without particular limitations. Specifically, examples thereof include an alicyclic ether group, a cyclic acetal group, a cyclic lactone group, a cyclic thioether group, a spiro-orthoester group, a vinyloxy group, and the like. As the cationically polymerizable group, an alicyclic ether group and a vinyloxy group are preferable, an epoxy group, an oxetanyl group, and a vinyloxy group are particularly preferable, and an epoxy group is most preferable. The epoxy group may be an alicyclic epoxy group (a group having a condensed ring structure of an epoxy group and an alicyclic group).

The polyorganosilsesquioxane (a1) is preferably a polyorganosilsesquioxane represented by General Formula (1).

In General Formula (1), Rb represents a group containing a cationically polymerizable group, and Rc represents a monovalent group. q and r each represent a proportion of each of Rb and Rc in General Formula (1), q+r=100, q is more than 0, and r is 0 or more. In a case where there is a plurality of Rb's and Rc's in General Formula (1), the plurality of Rb's and Rc's may be the same or different from each other respectively. In a case where there is a plurality of Rc's in General Formula (1), the plurality of Rc's may form a bond with each other.

$[SiO_{1.5}]$ in General Formula (1) represents a structural portion composed of a siloxane bond (Si—O—Si) in the polyorganosilsesquioxane.

The polyorganosilsesquioxane is a network-type polymer or polyhedral cluster having a siloxane constitutional unit derived from a hydrolyzable trifunctional silane compound (silsesquioxane unit), and can form a random structure, a ladder structure, a cage structure, and the like by a siloxane bond. In the present invention, although the structural portion represented by $[SiO_{1.5}]$ may be any of the above structures, it is preferable that the structural portion contain many ladder structures. In a case where the ladder structure is formed, the deformation recovery of a laminate can be excellently maintained. Whether the ladder structure is formed can be qualitatively determined by checking whether or not absorption occurs which results from Si—O—Si expansion/contraction unique to the ladder structure found at around 1,020 to 1,050 cm$^{-1}$ by Fourier Transform Infrared Spectroscopy (FT-IR).

In General Formula (1), Rb represents a group containing a cationically polymerizable group, and preferably represents a group containing an epoxy group.

Examples of the group containing an epoxy group include known groups having an oxirane ring.

Rb is preferably a group represented by Formulas (1b) to (4b).

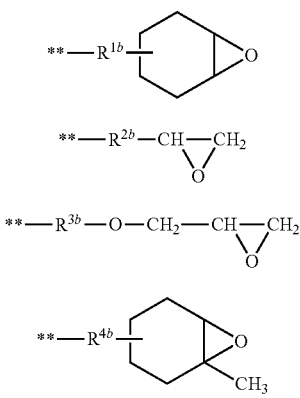

In Formulas (1b) to (4b), ** represents a portion linked to Si in General Formula (1), and $R^{1b}$, $R^{2b}$, $R^{3b}$, and $R^{4b}$ each represent a single bond or a divalent linking group.

$R^{1b}$, $R^{2b}$, $R^{3b}$, and $R^{4b}$ preferably each represent a substituted or unsubstituted alkylene group.

The alkylene group represented by $R^{1b}$, $R^{2b}$, $R^{3b}$, and $R^{4b}$ is preferably a linear or branched alkylene group having 1 to 10 carbon atoms, and examples thereof include a methylene group, a methyl methylene group, a dimethyl methylene group, an ethylene group an i-propylene group, a n-propylene group, a n-butylene group, a n-pentylene group, a n-hexylene group, a n-decylene group, and the like.

In a case where the alkylene group represented by $R^{1b}$, $R^{2b}$, $R^{3b}$, and $R^{4b}$ has a substituent, examples of the substituent include a hydroxyl group, a carboxyl group, an alkoxy group, an aryl group, a heteroaryl group, a halogen atom, a nitro group, a cyano group, a silyl group, and the like.

As $R^{1b}$, $R^{2b}$, $R^{3b}$, and $R^{4b}$, an unsubstituted linear alkylene group having 1 to 4 carbon atoms and an unsubstituted branched alkylene group having 3 or 4 carbon atoms are preferable, an ethylene group, a n-propylene group, or an i-propylene group is more preferable, and an ethylene group or an n-propylene group is even more preferable.

It is preferable that the polyorganosilsesquioxane (a1) has an alicyclic epoxy group (a group having a condensed ring structure of an epoxy group and an alicyclic group). Rb in General formula (1) is preferably a group having an alicyclic epoxy group, more preferably a group having an epoxycyclohexyl group, and even more preferably a group represented by Formula (1b).

Rb in General Formula (1) is derived from a group (a group other than an alkoxy group and a halogen atom) bonded to a silicon atom in the hydrolyzable trifunctional silane compound used as a raw material of the polyorganosilsesquioxane.

Specific examples of Rb are as below, but the present invention is not limited thereto. In the following specific examples, ** represents a portion linked to Si in General Formula (1).

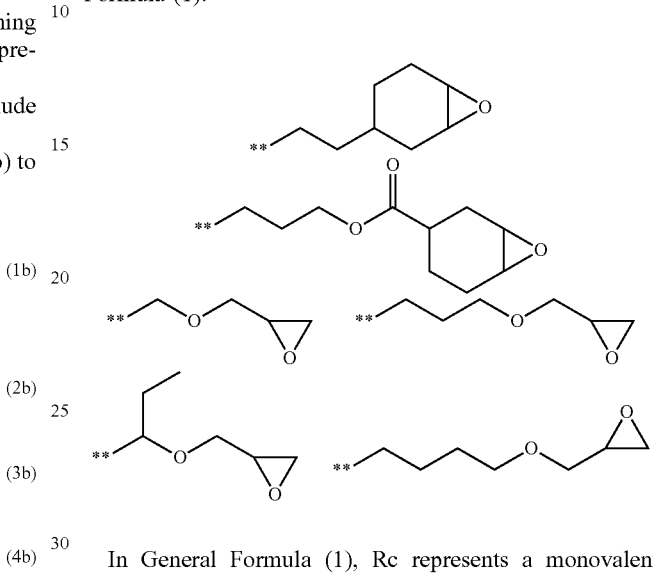

In General Formula (1), Rc represents a monovalent group.

Examples of the monovalent group represented by Rc include a hydrogen atom, a substituted or unsubstituted alkyl group, a substituted or unsubstituted cycloalkyl group, a substituted or unsubstituted alkenyl group, a substituted or unsubstituted aryl group, or a substituted or unsubstituted aralkyl group.

Examples of the alkyl group represented by Rc include an alkyl group having 1 to 10 carbon atoms. Examples thereof include linear or branched alkyl groups such as a methyl group, an ethyl group, a propyl group, a n-butyl group, an isopropyl group, an isobutyl group, a s-butyl group, a t-butyl group, and an isopentyl group.

Examples of the cycloalkyl group represented by Rc include a cycloalkyl group having 3 to 15 carbon atoms. Examples thereof include a cyclobutyl group, a cyclopentyl group, a cyclohexyl group, and the like.

Examples of the alkenyl group represented by Rc include an alkenyl group having 2 to 10 carbon atoms. Examples of the alkenyl group include a linear or branched alkenyl group such as a vinyl group, an allyl group, or an isopropenyl group.

Examples of the aryl group represented by Rc include an aryl group having 6 to 15 carbon atoms. Examples thereof include a phenyl group, a tolyl group, a naphthyl group, and the like.

Examples of the aralkyl group represented by Rc include an aralkyl group having 7 to 20 carbon atoms. Examples thereof include a benzyl group, a phenethyl group, and the like.

Examples of live substituted alkyl group, substituted cycloalkyl group, substituted alkenyl group, substituted aryl group, and substituted aralkyl group described above include groups obtained in a case where some or all of hydrogen atoms or main chain skeletons in the alkyl group, cycloalkyl group, alkenyl group, aryl group, and aralkyl group described above are substituted with at least one kind of group selected from the group consisting of an ether group, an ester group, a carbonyl group, a halogen atom (such as a fluorine atom), an acryloyl group, a methacryloyl group, a mercapto group, and a hydroxy group (hydroxyl group), and the like.

Rc is preferably a substituted or unsubstituted alkyl group, and more preferably an unsubstituted alkyl group having 1 to 10 carbon atoms.

In a case where there is a plurality of Rc's in General Formula (1), the plurality of Rc's may form a bond with each other. The number of Rc's forming a bond with each other is preferably 2 or 3, and more preferably 2.

A group ($Rc_2$) formed by the bonding of two Rc's is preferably an alkylene group formed by the bonding of the aforementioned substituted or unsubstituted alkyl groups represented by Rc.

Examples of the alkylene group represented by $Rc_2$ include linear or branched alkylene groups such as a methylene group, an ethylene group, a propylene group, an isopropylene group, a n-butylene group, an isobutylene group, a s-butylene group, a t-butylene group, a n-pentylene group, an isopentylene group, a s-pentylene group, a t-pentylene group, a n-hexylene group, an isohexylene group, a s-hexylene group, a t-hexylene group, a n-heptylene group, an isoheptylene group, a s-heptylene group, a t-heptylene group, a n-octylene group, an isooctylene group, a s-octylene group, and a t-octylene group.

The alkylene group represented by $Rc_2$ is preferably an unsubstituted alkylene group having 2 to 20 carbon atoms, more preferably an unsubstituted alkylene group having 2 to 20 carbon atoms, even more preferably an unsubstituted alkylene group having 2 to 8 carbon atoms, and particularly preferably a n-butylene group, a n-pentylene group, a n-hexylene group, a n-heptylene group, or a n-octylene group.

A group ($Rc_3$) formed by the bonding of three Rc's is preferably a trivalent group obtained in a case where any one of the hydrogen atoms in the alkylene group represented by $Rc_2$ is removed.

Rc in General Formula (1) is derived from a group (a group other than an alkoxy group and a halogen atom) bonded to a silicon atom in the hydrolyzable silane compound used as a raw material of the polyorganosilsesquioxane.

In General Formula (1), q is more than 0, and r is 0 or more.

q/(q+r) is preferably 0.5 to 1.0. In a case where the amount of the group represented by Rb is 50% or more of the total amount of the groups represented by Rb and Rc contained in the polyorganosilsesquioxane (a1), the network composed of organic crosslinking groups is sufficiently formed. Therefore, the performances such as hardness and resistance to repeated folding can be excellently maintained.

q/(q+r) is more preferably 0.7 to 1.0, even more preferably 0.9 to 1.0, and particularly preferably 0.95 to 1.0.

It is also preferable that there is a plurality of Rc's in General Formula (1), and the plurality of Rc's form a bond with each other. In this case, r/(q+r) is preferably 0.005 to 0.20.

r/(q+r) is more preferably 0.005 to 0.10, even more preferably 0.005 to 0.05, and particularly preferably 0.005 to 0.025.

The number-average molecular weight (Mn) of the polyorganosilsesquioxane (a1) that is measured by gel permeation chromatography (GPC) and expressed in terms of standard polystyrene is preferably 500 to 6,000, more preferably 1,000 to 4,500, and even more preferably 1,500 to 3,000.

The molecular weight dispersity (Mw/Mn) of the polyorganosilsesquioxane (a1) that is measured by GPC and expressed in terms of standard polystyrene is, for example, 1.0 to 4.0, preferably 1.1 to 3.7, more preferably 1.2 to 3.0, and even more preferably 1.3 to 2.5. Mw represents weight-average molecular weight, and Mn represents number-average molecular weight.

The weight-average molecular weight and the molecular weight dispersity of the polyorganosilsesquioxane (a1) are measured using the following device under the following conditions.

Measurement device: trade name "LC-20AD" (manufactured by Shimadzu Corporation)

Columns: two Shodex KF-801 columns, KF-802, and KF-803 (manufactured by SHOWA DENKO K.K.)

Measurement temperature: 40° C.

Eluent: tetrahydrofuran (THF), sample concentration of 0.1% to 0.2% by mass

Flow rate: 1 mL/min

Detector: UV-VIS detector (trade name "SPD-20A", manufactured by Shimadzu Corporation)

Molecular weight: expressed in terms of standard polystyrene

One kind of polyorganosilsesquioxane (a1) may be used singly, or two or more kinds of polyorganosilsesquioxanes (a1) having different structures may be used in combination.

The content rate of the polyorganosilsesquioxane (a1) in the composition for forming a hardcoat layer according to the embodiment of the present invention with respect to the total solid content of the composition for forming a hardcoat layer is preferably 50% by mass or more, more preferably 70% by mass or more, and even more preferably 80% by mass or more. The upper limit of the content rate of the polyorganosilsesquioxane (a1) in the composition for forming a hardcoat layer is preferably 99.999% by mass or less, more preferably 99.99% by mass or less, and even more preferably 99.9% by mass or less.

The total solid content means all components other than solvents.

(Cationic Polymerization Initiator)

The composition for forming a hardcoat layer according to the embodiment of the present invention preferably contains a cationic polymerization initiator.

Only one kind of cationic polymerization initiator may be used, or two or more kinds of cationic polymerization initiators having different structures may be used in combination. Furthermore, the cationic polymerization initiator may be a photo polymerization initiator or a thermal polymerization initiator.

The content rate of the cationic polymerization initiator in the composition for forming a hardcoat layer is not particularly limited. For example, the content rate with respect to 100 parts by mass of the polyorganosilsesquioxane (a1) is preferably 0.1 to 200 parts by mass, and more preferably 1 to 50 parts by mass.

(Solvent)

The composition for forming a hardcoat layer according to the embodiment of the present invention may contain a solvent.

As the solvent, an organic solvent is preferable. One kind of organic solvent can be used, or two or more kinds of organic solvents can be used by being mixed together at any ratio. Specific examples of the organic solvent include alcohols such as methanol, ethanol, propanol, n-butanol, and i-butanol; ketones such as acetone, methyl isobutyl ketone, methyl ethyl ketone, and cyclohexanone; cellosolves such as ethyl cellosolve; aromatic solvents such as toluene and xylene; glycol ethers such as propylene glycol monomethyl ether; acetic acid esters such as methyl acetate, ethyl acetate, and butyl acetate; diacetone alcohol; and the like.

The content rate of the solvent in the composition for forming a hardcoat layer according to the embodiment of the present invention can be appropriately adjusted within a range in which the coating suitability of the composition for forming a hardcoat layer can be ensured. For example, the content rate of the solvent with respect to the total solid content, 100 parts by mass, of the composition for forming a hardcoat layer can be 50 to 500 parts by mass, and preferably 80 to 200 parts by mass.

The composition for forming a hardcoat layer is generally in the form of a liquid.

Generally, the concentration of solid contents of the composition for forming a hardcoat layer is about 10% to 90% by mass, preferably about 20% to 80% by mass, and particularly preferably about 40% to 70% by mass.

The composition for forming a hardcoat layer according to the embodiment of the present invention may contain components other than the above, for example, inorganic particles, a dispersant, a leveling agent, an antifouling agent, an antistatic agent, an ultraviolet absorber, an antioxidant, and the like.

The composition for forming a hardcoat layer according to the embodiment of the present invention can be prepared by simultaneously mixing together the various components described above or sequentially mixing together the various components described above in any order. The preparation method is not particularly limited, and the composition can be prepared using a known stirrer or the like.

(Film Thickness of Hardcoat Layer)

The film thickness of a hardcoat layer that can be formed of the composition for forming a hardcoat layer according to the embodiment of the present invention is not particularly limited. The film thickness of the hardcoat layer is preferably 0.5 to 30 µm, more preferably 1 to 25 µm, and even more preferably 2 to 20 µm.

The film thickness of the hardcoat layer is calculated by observing a cross section of a laminate with an optical microscope. The cross-sectional sample can be prepared by a microtome method using a cross section cutting device ultramicrotome, a cross section processing method using a focused ion beam (FIB) device, or the like.

<Substrate>

The composition for forming a hardcoat layer according to the embodiment of the present invention can be made into a hardcoat layer by coating a substrate with the composition and curing the coating film.

The transmittance of the substrate in a visible light region is preferably 70% or more, more preferably 80% or more, and even more preferably 90% or more.

(Polymer)

The substrate preferably contains a polymer.

As the polymer, a polymer excellent in optical transparency, mechanical strength, heat stability, and the like is preferable.

Examples of such a polymer include polycarbonate-based polymers, polyester-based polymers such as polyethylene terephthalate (PET) and polyethylene naphthalate (PEN), styrene-based polymers such as polystyrene and an acrylonitrile/styrene copolymer (AS resin), and the like. The examples also include polyolefins such as polyethylene and polypropylene, norbornene-based resins, polyolefin-based polymers such as ethylene/propylene copolymers, (meth) acrylic polymers such as polymethyl methacrylate, vinyl chloride-based polymers, amide-based polymers such as nylon and aromatic polyamide, imide-based polymers, sulfone-based polymers, polyether sulfone-based polymers, polyether ether ketone-based polymers, polyphenylene sulfide-based polymers, vinylidene chloride-based polymers, vinyl alcohol-based polymers, vinyl butyral-based polymers, arylate-based polymers, polyoxymethylene-based polymers, epoxy-based polymers, cellulose-based polymers represented by triacetyl cellulose, copolymers of the above polymers, and polymers obtained by mixing together the above polymers.

Particularly, amide-based polymers such as aromatic polyamide and imide-based polymers can be preferably used as the substrate, because the number of times of folding at break measured for these polymers by an MIT tester according to Japanese Industrial Standards (JIS) P8115 (2001) is large, and these polymers have relatively high hardness. For example, the aromatic polyamide described in Example 1 of JP5699454B and the polyimides described in JP2015-508345A, JP2016-521216A, and WO2017/014287A can be preferably used as the substrate.

As the amide-based polymer, aromatic polyamide (aramid-based polymer) is preferable.

The substrate preferably contains at least one kind of polymer selected from imide-based polymers and aramid-based polymers.

(Thickness of Substrate)

The substrate is preferably in the form of a film.

The thickness of the substrate is more preferably 100 µm or less, even more preferably 80 µm or less, and most preferably 50 µm or less. In addition, from the viewpoint of ease of handling of the substrate, the thickness of the substrate is preferably 3 µm or more, more preferably 5 µm or more, and most preferably 15 µm or more.

<Anti-Scratch Layer>

The polyorganosilsesquioxane according to the embodiment of the present invention can be preferably applied to a hardcoat film having a substrate, a hardcoat layer (layer formed of the composition for forming a hardcoat layer containing the polyorganosilsesquioxane according to the embodiment of the present invention), and an anti-scratch layer in this order.

The anti-scratch layer is not particularly limited, but is preferably a layer formed by curing a composition for forming an anti-scratch layer containing a radically polymerizable compound (c1).

(Radically Polymerizable Compound (c1))

The radically polymerizable compound (c1) (also called "compound (c1)") will be described.

The compound (c1) is a compound having a radically polymerizable group.

As the radically polymerizable group in the compound (c1), a generally known radically polymerizable group can be used without particular limitations. Examples of the radically polymerizable group include polymerizable unsaturated groups. Specifically, examples thereof include a (meth)acryloyl group, a vinyl group, an allyl group, and the like. Among these, a (meth)acryloyl group is preferable. Each of the above groups may have a substituent.

The compound (c1) is preferably a compound having two or more (meth)acryloyl groups in one molecule, and more preferably a compound having three or more (meth)acryloyl groups in one molecule.

The molecular weight of the compound (c1) is not particularly limited. The compound (c1) may be a monomer, an oligomer, or a polymer.

As the compound (c1), only one kind of compound may be used, or two or more kinds of compounds having different structures may be used in combination.

The content rate of the compound (c1) in the composition for forming an anti-scratch layer with respect to the total solid content of the composition for forming an anti-scratch layer is preferably 80% by mass or more, more preferably 85% by mass or more, and even more preferably 90% by mass or more.

(Radical Polymerization Initiator)

The composition for forming an anti-scratch layer preferably contains a radical polymerization initiator.

Only one kind of radical polymerization initiator may be used, or two or more kinds of radical polymerization initiators having different structures may be used in combination. Furthermore, the radical polymerization initiator may be a photopolymerization initiator or a thermal polymerization initiator.

The content rate of the radical polymerization initiator in the composition for forming an anti-scratch layer is not particularly limited. For example, the content rate with respect to 100 parts by mass of the compound (c1) is preferably 0.1 to 200 parts by mass, and more preferably 1 to 50 parts by mass.

(Solvent)

The composition for forming an anti-scratch layer may contain a solvent.

This solvent is the same as the solvent that may be contained in the aforementioned composition for forming a hardcoat layer.

The content rate of the solvent in the composition for forming an anti-scralch layer according to the embodiment of the present invention can be appropriately adjusted within a range in which the coating suitability of the composition for forming an anti-scratch layer can be ensured. For example, the content rate of the solvent with respect to the total solid content, 100 parts by mass, of the composition for forming an anti-scratch layer can be 50 to 500 parts by mass, and preferably 80 to 200 parts by mass.

The composition for forming an anti-scratch layer is generally in the form of a liquid.

The concentration of solid contents of the composition for forming an anti-scratch layer is generally about 10% to 90% by mass, preferably about 20% to 80% by mass, and particularly preferably about 40% to 70% by mass.

(Other Additives)

The composition for forming an anti-scratch layer may contain components other than the above, for example, inorganic particles, a leveling agent, an antifouling agent, an antistatic agent, a slip agent, a solvent, and the like.

(Film Thickness of Anti-Scratch Layer)

From the viewpoint of resistance to repeated folding, the film thickness of the anti-scratch layer is preferably less than 3.0 μm, more preferably 0.1 to 2.0 μm, and even more preferably 0.1 to 1.0 μm.

EXAMPLES

Hereinafter, the present invention will be more specifically described using examples, but the scope of the present invention is not limited thereto.

<Synthesis of Polyorganosilsesquioxane>

(Synthesis of Polyorganosilsesquioxane Represented by (SX1-1))

Trimethoxy(1H,1H,2H,2H-tridecafluoro-n-octyl)silane (30 mmol, 14.05 g), 135 mmol (33.26 g) of 2-(3,4-epoxycyclohexyl)ethyltrimethoxysilane, 135 mmol (31.63 g) of 3-(trimethoxysilyl)propyl acrylate, 7.39 g of triethylamine, and 370 g of methyl isobutyl ketone (MIBK) were mixed together, and 73.9 g of pure water was added dropwise to the mixture for 30 minutes by using a dropping funnel. The reaction solution was heated to 50° C., and a polycondensation reaction was carried out for 10 hours.

Thereafter, the reaction solution was cooled, 300 g of a 5% by mass saline was added thereto, and the organic layer was extracted. The organic layer was washed with 300 g of 5% by mass saline and washed twice with 300 g of pure water in this order, and then concentrated under the conditions of 30 mmHg and 50° C., thereby obtaining a polyorganosilsesquioxane represented by Formula (SX1-1) which was a colorless and transparent liquid product as a MIBK solution having a concentration of solid contents of 52% by mass.

The polymer (5 mg) obtained as above was dissolved in 0.5 mL of deuterated chloroform, and measured using BRUKER AVANCE III HD 400 MHz (manufactured by Hitachi High-Tech Science Corporation.) The results will be shown below.

$^1$H NMR (400 MHz, CDCl$_3$, ppm): δ 6.3-6.5 (m, (III) acrylic part CH$_2$=CHCO$_2$), δ 6.0-6.2 (m, (III) acrylic part CH$_2$=CHCO$_2$), δ 5.7-5.9 (m, (III) acrylic part CH$_2$=CHCO$_2$), δ 4.0-4.2 (m, CH$_2$=CHCO$_2$CH$_2$ adjacent to (III) acrylic part), δ 3.0-3.2 (m, (II) epoxy part CHOCH), δ 1.8-2.3 (m, C$_6$F$_{13}$CH$_2$CH$_2$ adjacent to (I) fluorine), δ 1.6-1.8 (m, CH$_2$Si adjacent to (III) silyl group), δ 1.0-1.5 (m, (II) alicyclic part C$_6$H$_6$), δ 0.8-1.0 (m, C$_6$F$_{13}$CH$_2$CH$_2$Si adjacent to (I) silyl group), δ 0.4-0.8 (m, (II) & (III) methylene part CH$_2$CH$_2$CH$_2$Si).

In the synthesis of the polyorganosilsesquioxane represented (SX1-1), the amount of each monomer used was changed, thereby synthesizing polyorganosilsesquioxanes ((SX1-2), (SX1-3), (SX1-4), and (SX1-5)) in which the molar ratio of contents of constitutional units was changed.

In the synthesis of the polyorganosilsesquioxane represented by (SX1-1), trimethoxy(1H,1H,2H,2H-tridecafluoro-n-octyl)silane was changed to trimethoxy(1H,1H,2H,2H-nonafluoro-n-hexyl)silane), thereby synthesizing a polyorganosilsesquioxane represented by (SX2-1).

In the synthesis of the polyorganosilsesquioxane represented by (SX1-1), trimethoxy(1H,1H,2H,2H-tridecafluoro-n-octyl)silane was changed to trimethoxy(1H,1H,2H,2H-trifluoro-n-propyl)silane), thereby synthesizing a polyorganosilsesquioxane represented by (SX6-1).

In the synthesis of the polyorganosilsesquioxane represented by (SX1-1), 2-(3,4-epoxycyclohexyl)ethyltrimethoxysilane was changed to 3-glycidyloxypropyltrimethoxysilane, thereby synthesizing a polyorganosilsesquioxane represented by (SX7-1).

In the synthesis of the polyorganosilsesquioxane represented by (SX1-1), 3-(trimethoxysilyl)propyl acrylate was changed to 3-(trimethoxysilyl)propyl methacrylate, thereby synthesizing a polyorganosilsesquioxane represented by (SX8-1).

In the synthesis of the polyorganosilsesquioxane represented by (SX1-1), 3-(trimethoxysilyl)propyl acrylate was changed to allyltrimethoxysilane, thereby synthesizing a polyorganosilsesquioxane represented by (SX9-1).

In the synthesis of the polyorganosilsesquioxane represented by (SX1-1), 2-(3,4-epoxycyclohexyl)ethyltrimethoxysilane was changed to 3-ethyl-3-[[3-(trimethoxysilyl)propoxy]methyl]oxetane, thereby synthesizing a polyorganosilsesquioxane represented by (SX10-1).

In the synthesis of the polyorganosilsesquioxane represented by (SX1-1), 2-(3,4-epoxycyclohexyl)ethyltrimethoxysilane was not used, and the amount of each of other monomers used was changed, thereby synthesizing a polyorganosilsesquioxane represented by (R-1).

In the synthesis of the polyorganosilsesquioxane represented by (SX1-1), 3-(trimethoxysilyl)propyl acrylate was not used, and the amount of each of other monomers used was changed, thereby synthesizing a polyorganosilsesquioxane represented by (R-2).

The structure, weight-average molecular weight (Mw), and molecular weight dispersity (Mw/Mn) of each the polyorganosilsesquioxanes are shown below. In the following structural formulas, "$SiO_{1.5}$" represents a silsesquioxane unit.

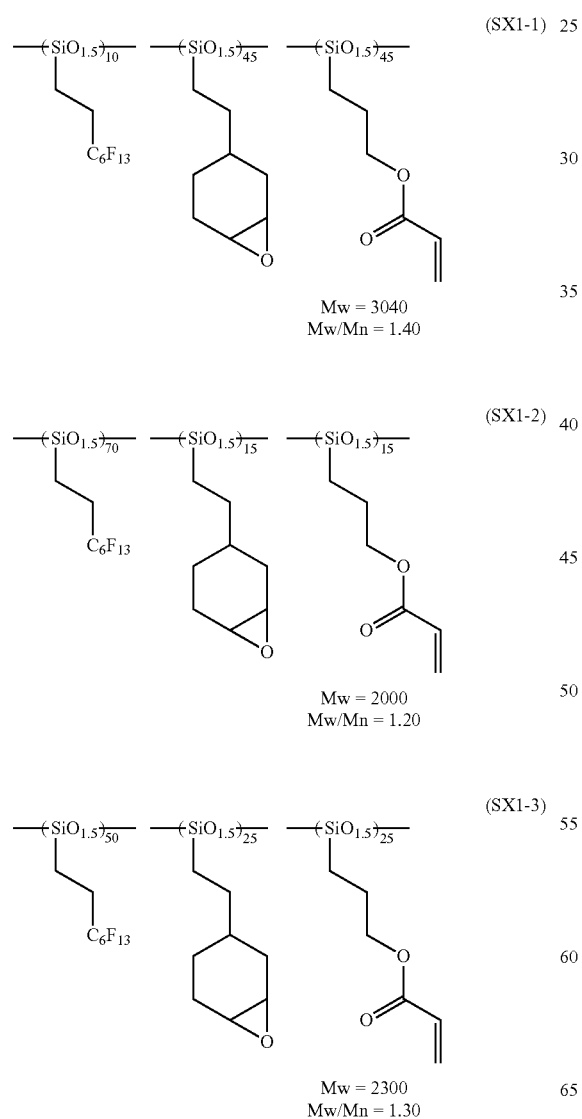

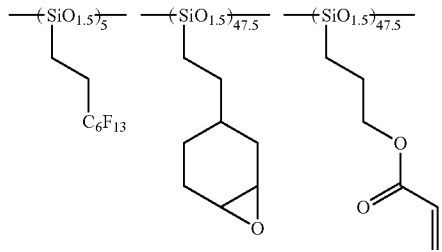

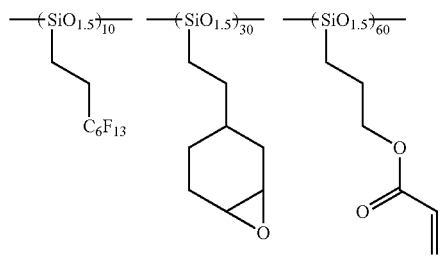

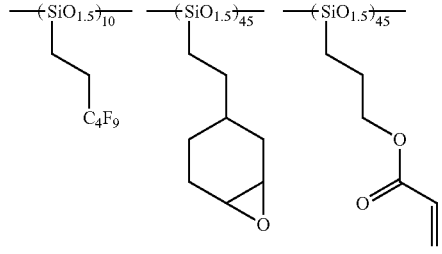

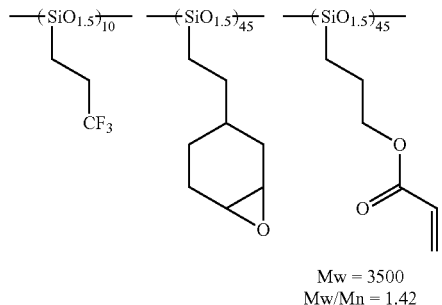

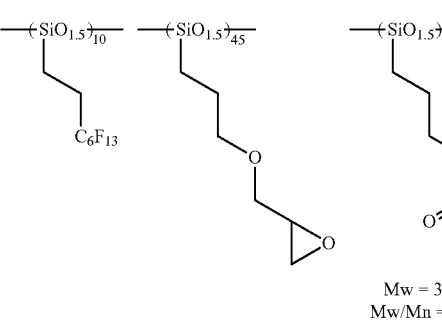

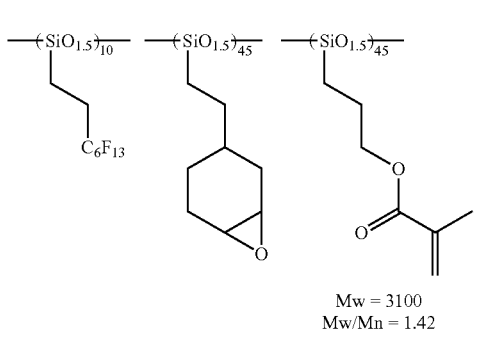

(SX8-1)

Mw = 3100
Mw/Mn = 1.42

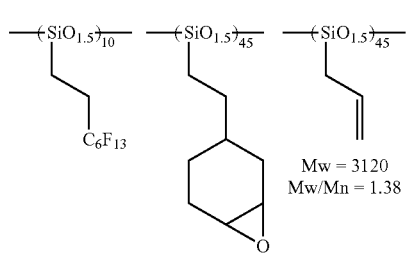

(SX9-1)

Mw = 3120
Mw/Mn = 1.38

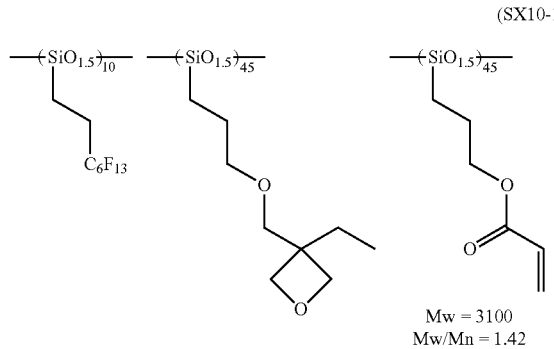

(SX10-1)

Mw = 3100
Mw/Mn = 1.42

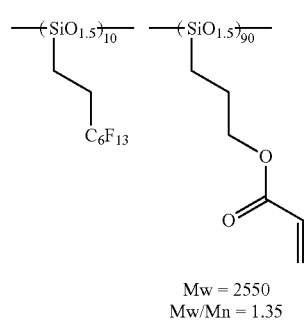

(R-1)

Mw = 2550
Mw/Mn = 1.35

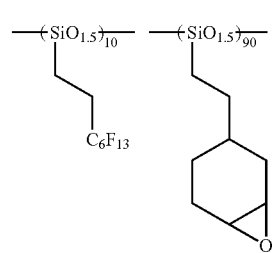

(R-2)

Mw = 3400
Mw/Mn = 1.45

Hardcoat films each having a substrate, a hardcoat layer, and an anti-scratch layer were manufactured using the above polyorganosilsesquioxanes as interlayer adhesives, and the scratch resistance of the hardcoat films was evaluated.

<Preparation of Substrate>
(Manufacturing of Polyimide Powder)

Under a nitrogen stream, 832 g of N,N-dimethylacetamide (DMAc) was added to a 1 L reactor equipped with a stirrer, a nitrogen injection device, a dropping funnel, a temperature controller, and a cooler, and then the temperature of the reactor was set to 25° C. Bistrifluoromethylbenzidine (TFDB) (64.046 g (0.2 mol)) was added thereto and dissolved. The obtained solution was kept at 25° C., and in this state, 31.09 g (0.07 mol) of 2,2-bis(3,4-dicarboxyphenyl)hexafluoropropane dianhydride (6FDA) and 8.83 g (0.03 mol) of biphenyltetracarboxylic dianhydride (BPDA) were added thereto, and the mixture was allowed to react by being stirred for a certain period of time. Then, 20.302 g (0.1 mol) of terephthaloyl chloride (TPC) was added thereto, thereby obtaining a polyamic acid solution with a concentration of solid contents of 13% by mass. Thereafter, 25.6 g of pyridine and 33.1 g of acetic anhydride were added to the polyamic acid solution, and the mixture was stirred for 30 minutes, further stirred at 70° C. for 1 hour, and then cooled to room temperature. Methanol (20 L) was added thereto, and the precipitated solid contents were filtered and ground. Subsequently, the ground resultant was dried in a vacuum at 100° C. for 6 hours, thereby obtaining 111 g of polyimide powder.

(Preparation of Substrate S-1)

The aforementioned polyimide powder (100 g) was dissolved in 670 g of N,N-dimethylacetamide (DMAc), thereby obtaining a 13% by mass solution. The obtained solution was cast on a stainless steel plate and dried with hot air at 130° C. for 30 minutes. Then, the film was peeled from the stainless steel plate and fixed to a frame by using pins, and the frame to which the film was fixed was put in a vacuum oven, heated for 2 hours by slowly increasing the heating temperature up to 300° C. from 100° C., and then slowly cooled. The cooled film was separated from the frame. Then, as a final heat treatment step, the film was further treated with heat for 30 minutes at 300° C., thereby obtaining a substrate S-1 having a film thickness of 30 μm consisting of a polyimide film.

<Synthesis of Polyorganosilsesquioxane (a1)>
(Synthesis of Compound (A))

In a 1,000 ml flask (reaction vessel) equipped with a thermometer, a stirrer, a reflux condenser, and a nitrogen introduction pipe, 300 mmol (73.9 g) of 2-(3,4-epoxycyclohexyl)ethyltrimethoxysilane, 7.39 g of triethylamine, and 370 g of methyl isobutyl ketone (MIBK) were mixed together under a nitrogen stream, and 73.9 g of pure water was added drop wise thereto for 30 minutes by using a dropping funnel. The reaction solution was heated to 80° C. so that a polycondensation reaction was carried out under a nitrogen stream for 10 hours.

Thereafter, the reaction solution was cooled, 300 g of a 5% by mass saline was added thereto, and the organic layer was extracted. The organic layer was washed with 300 g of 5% by mass saline and washed twice with 300 g of pure water in this order, and then concentrated under the conditions of 1 mmHg and 50° C., thereby obtaining 87.0 g of a colorless and transparent liquid product {the compound (A) as a polyorganosilsesquioxane (a1) having an alicyclic epoxy group (the compound represented by General Formula (1) in which Rb represents a 2-(3,4-epoxycyclohexyl) ethyl group, q=100, and r=0)} as an MIBK solution at a concentration of solid contents of 59.8% by mass.

As a result of analysis, the product has been found to have a number-average molecular weight of 2,050 and a molecular weight dispersity of 1.9.

Note that 1 mmHg equals about 133.322 Pa.

Example 1

<Preparation of Composition for Forming Hardcoat Layer>
(Composition HC-1 for Forming Hardcoat Layer)

An interlayer adhesive (SX1-1), CPI-110P, and methyl isobutyl ketone (MIBK) were added to the MIBK solution containing the compound (A), the content of each of the components was adjusted to the following amount, and the mixture was put in a mixing tank and stirred. The obtained composition was filtered through a polypropylene filter having a pore size of 0.45 μm, thereby obtaining a composition HC-1 for forming a hardcoat layer.

Compound (A) 164.38 parts by mass

| Interlayer adhesive (SX1-1) | 0.38 parts by mass |
| CPI-110P | 3.0 parts by mass |
| MIBK | 67.70 parts by mass |

CPI-110P is a pholocationic polymerization initiator (concentration of solid contents: 50% by mass) manufactured by San-Apro Ltd.)

<Preparation of Composition for Forming Anti-Scratch Layer>
(Composition SR-1 for Forming Anti-Scratch Layer)

Components composed as below were put in a mixing tank, stirred, and filtered through a polypropylene filter having a pore size of 0.4 μm, thereby obtaining a composition SR-1 for forming an anti-scratch layer.

| DPHA | 96.2 parts by mass |
| IRGACURE 127 | 2.8 parts by mass |
| RS-90 | 1.0 part by mass |

Methyl ethyl ketone 300.0 parts by mass

The compounds used in the composition for forming an anti-scratch layer are as follows.

DPHA: mixture of dipentaerythritol pentaacrylate and dipentaerythrtiol hexaacrylate, manufactured by Nippon Kayaku Co., Ltd.

IRGACURE 127 (Irg. 127): radical photopolymerization initiator, manufactured by BASF SE RS-90: slip agent, manufactured by DIC Corporation (Manufacturing of Hardcoat Film)

The polyimide substrate S-1 having a thickness of 30 μm was coated with the composition HC-1 for forming a hardcoat layer by using a #18 wire bar so that the film thickness was 18 μm after curing, thereby providing hardcoat layer coating film on the substrate.

Thereafter, the hardcoat layer coating film was dried at 120° C. for 1 minute and then irradiated with ultraviolet at an illuminance of 18 mW/cm$^2$ and an irradiation dose of 19 mJ/cm$^2$ by using an air-cooled mercury lamp under the conditions of 25° C. and an oxygen concentration of 100 ppm (parts per million). In this way, the hardcoat layer coating film was semi-cured.

Then, by using a die coater, the semi-cured hardcoat layer coating film was coated with the composition SR-1 for forming an anti-scratch layer so that the film thickness was 0.8 μm after curing.

Thereafter, the obtained laminate was dried at 120° C. for 1 minute and then irradiated with ultraviolet at an illuminance of 60 mW/cm$^2$, an irradiation dose of 600 mJ/cm$^2$, and an oxygen concentration of 100 ppm at 25° C. and further irradiated with ultraviolet at an illuminance of 60 mW/cm$^2$ and an irradiation dose of 600 mJ/cm$^2$ by using an air-cooled mercury lamp under the condition of 80° C. and an oxygen concentration of 100 ppm. In this way, the hardcoat layer coating film and the anti-scratch layer coating film were fully cured.

Then, the obtained laminate was treated with heat at 120° C. for 1 hour, thereby obtaining a hardcoat film having a hardcoat layer and an anti-scratch layer on a substrate.

Examples 2 to 11 and Comparative Examples 1 to 3

Hardcoat films were manufactured in the same manner as in Example 1, except that the types of interlayer adhesives used were changed as shown in the following Table 1.

(Evaluation of Scratch Resistance)

By using a rubbing tester, a rubbing test was performed on the surface of the anti-scratch layer of each of the manufactured hardcoat films under the following conditions, thereby obtaining indices of scratch resistance.

Environmental conditions for evaluation: 25° C., relative humidity 60%

Rubbing Material: steel wool (NIHON STEEL WOOL Co., Ltd., grade #0000)

The steel wool was wound around the rubbing tip portion (2 cm×2 cm) of the tester coming into contact with the sample and fixed with a band.

Moving distance (one way): 13 cm

Rubbing speed: 13 cm/sec

Load: 1 kg/cm$^2$

Contact area of tip portion 2 cm×2 cm

After the test, an oil-based black ink was applied to a surface (surface of the substrate) of the hardcoat film that was opposite to the rubbed surface (surface of the anti-scratch layer). The reflected light was visually observed, the number of times of rubbing that caused scratches in the portion contacting the steel wool was counted, and the scratch resistance was evaluated.

In the following Table 1, the content rate (% by mass) of the interlayer adhesive is a value with respect to the total solid content of the composition for forming a hardcoat layer.

TABLE 1

| | | Composition for forming hardcoat layer | | | | Composition for forming anti-scratch layer | | |
|---|---|---|---|---|---|---|---|---|
| | | | Cationic | Interlayer adhesive (polyorganosilsesquioxane) | | Radically | Radical | Evaluation |
| | Substrate | Polyorganosilsesquioxane (a1) | polymerization initiator | Type | Content rate (% by mass) | polymerizable compound | polymerization initiator | Scratch resistance |
| Example 1 | S-1 | Compound (A) | CPI-110P | SX1-1 | 0.2% | DPHA | Irg. 127 | 1,200 times |
| Example 2 | S-1 | Compound (A) | CPI-110P | SX2-1 | 0.2% | DPHA | Irg. 127 | 1,000 times |
| Example 3 | S-1 | Compound (A) | CPI-110P | SX6-1 | 0.2% | DPHA | Irg. 127 | 700 times |
| Example 4 | S-1 | Compound (A) | CPI-110P | SX1-2 | 0.2% | DPHA | Irg. 127 | 600 times |
| Example 5 | S-1 | Compound (A) | CPI-110P | SX1-3 | 0.2% | DPHA | Irg. 127 | 900 times |
| Example 6 | S-1 | Compound (A) | CPI-110P | SX1-4 | 0.2% | DPHA | Irg. 127 | 2,200 times |
| Example 7 | S-1 | Compound (A) | CPI-110P | SX7-1 | 0.2% | DPHA | Irg. 127 | 1,000 times |
| Example 8 | S-1 | Compound (A) | CPI-110P | SX8-1 | 0.2% | DPHA | Irg. 127 | 1,000 times |
| Example 9 | S-1 | Compound (A) | CPI-110P | SX9-1 | 0.2% | DPHA | Irg. 127 | 800 times |
| Example 10 | S-1 | Compound (A) | CPI-110P | SX10-1 | 0.2% | DPHA | Irg. 127 | 900 times |
| Example 11 | S-1 | Compound (A) | CPI-110P | SX1-5 | 0.2% | DPHA | Irg. 127 | 1,500 times |
| Comparative example 1 | S-1 | Compound (A) | CPI-110P | N/A | — | DPHA | Irg. 127 | 100 times |
| Comparative example 2 | S-1 | Compound (A) | CPI-110P | R-1 | 0.2% | DPHA | Irg. 127 | 200 times |
| Comparative example 3 | S-1 | Compound (A) | CPI-110P | R-2 | 0.2% | DPHA | Irg. 127 | 200 times |

As shown in Table 1, the hardcoat films in which the interlayer adhesives (polyorganosilsesquioxanes) of Examples 1 to 11 were used had excellent scratch resistance.

Industrial Applicability

According to the present invention, it is possible to provide a polyorganosilsesquioxane capable of forming a hardcoat film having excellent scratch resistance, and a composition for forming a hardcoat layer.

The present invention has been described in detail with reference to specific embodiments. To those skilled in the art, it is obvious that various changes or modifications can be added without departing from the gist and scope of the present invention.

What is claimed is:

1. A composition for forming a hardcoat layer comprising a polyorganosilsesquioxane which includes:
   a constitutional unit (a) having a fluorine atom-containing group;
   a constitutional unit (b) having a cationically polymerizable group; and
   a constitutional unit (c) having a radically polymerizable group,
   wherein a content rate of the polyorganosilsesquioxane is 0.001 to 3% by mass with respect to a total solid content in the composition for forming a hardcoat layer.

2. The composition for forming a hardcoat layer according to claim 1,
   wherein the constitutional unit (a) is a constitutional unit represented by the following General Formula (S-1),
   wherein the constitutional unit (b) is a constitutional unit represented by the following General Formula (S-2), and
   wherein the constitutional unit (c) is a constitutional unit represented by the following General Formula (S-3),

(S-1)

(S-2)

(S-3)

wherein, in the General Formula (S-1), $L_1$ represents a single bond or a divalent linking group, and $Q_1$ represents the fluorine atom-containing group,
   wherein in the General Formula (S-2), $L_2$ represents a single bond or a divalent linking group, and $Q_2$ represents the cationically polymerizable group, and
   wherein in the General Formula (S-3), $L_3$ represents a single bond or a divalent linking group, and $Q_3$ represents the radically polymerizable group.

3. The composition for forming a hardcoat layer according to claim 1,
   wherein the cationically polymerizable group of the constitutional unit (b) is an epoxy group.

4. The composition for forming a hardcoat layer according to claim 2,
   wherein the cationically polymerizable group of the constitutional unit (b) is an epoxy group.

5. The composition for forming a hardcoat layer according to claim 3,
   wherein the epoxy group is an alicyclic epoxy group.

6. The composition for forming a hardcoat layer according to claim 4,
   wherein the epoxy group is an alicyclic epoxy group.

7. The composition for forming a hardcoat layer according to claim 1, wherein the radically polymerizable group of the constitutional unit (c) is a (meth)acryloyl group.

8. The composition for forming a hardcoat layer according to claim 2,
wherein the radically polymerizable group of the constitutional unit (c) is a (meth)acryloyl group.

9. The composition for forming a hardcoat layer according to claim 3,
wherein the radically polymerizable group of the constitutional unit (c) is a (meth)acryloyl group.

10. The composition for forming a hardcoat layer according to claim 1,
wherein the number of fluorine atoms contained in the fluorine atom-containing group of the constitutional unit (a) is 9 or more.

11. The composition for forming a hardcoat layer according to claim 2,
wherein the number of fluorine atoms contained in the fluorine atom-containing group of the constitutional unit (a) is 9 or more.

12. The composition for forming a hardcoat layer according to claim 3,
wherein the number of fluorine atoms contained in the fluorine atom-containing group of the constitutional unit (a) is 9 or more.

13. The composition for forming a hardcoat layer according to claim 1,
wherein a molar ratio of a content of the constitutional unit (a) to a total content of constitutional units of the polyorganosilsesquioxane is 50 mol % or less.

14. The composition for forming a hardcoat layer according to claim 2,
wherein a molar ratio of a content of the constitutional unit (a) to a total content of constitutional units of the polyorganosilsesquioxane is 50 mol % or less.

15. The composition for forming a hardcoat layer according to claim 3,
wherein a molar ratio of a content of the constitutional unit (a) to a total content of constitutional units of the polyorganosilsesquioxane is 50 mol % or less.

16. The composition for forming a hardcoat layer according to claim 1,
wherein a molar ratio of a content of the constitutional unit (b) to a total content of constitutional units of the polyorganosilsesquioxane is 15 mol % or more.

17. The composition for forming a hardcoat layer according to claim 2,
wherein a molar ratio of a content of the constitutional unit (b) to a total content of constitutional units of the polyorganosilsesquioxane is 15 mol % or more.

18. The composition for forming a hardcoat layer according to claim 1,
wherein a molar ratio of a content of the constitutional unit (c) to a total content of constitutional units of the polyorganosilsesquioxane is 15 mol % or more.

19. The composition for forming a hardcoat layer according to claim 2,
wherein a molar ratio of a content of the constitutional unit (c) to a total content of constitutional units of the polyorganosilsesquioxane is 15 mol % or more.

* * * * *